(12) United States Patent
Pedersen et al.

(10) Patent No.: US 11,772,075 B2
(45) Date of Patent: *Oct. 3, 2023

(54) CATALYST FOR USE IN THE SELECTIVE CATALYTIC REDUCTION (SCR) OF NITROGEN OXIDES

(71) Applicant: Umicore AG & Co. KG, Hanau-Wolfgang (DE)

(72) Inventors: Kim Hougaard Pedersen, Virum (DK); Anders Hjordt Pedersen, Copenhagen N (DK); Martin Dam, Gentofte (DK)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,347

(22) Filed: Jul. 21, 2022

(65) Prior Publication Data

US 2022/0355274 A1 Nov. 10, 2022

Related U.S. Application Data

(63) Continuation of application No. 17/268,852, filed as application No. PCT/EP2019/072706 on Aug. 26, 2019, now Pat. No. 11,426,709.

(30) Foreign Application Priority Data

Aug. 28, 2018 (EP) ..................................... 18191131
Apr. 26, 2019 (EP) ..................................... 19171394

(51) Int. Cl.
| | |
|---|---|
| *B01J 23/22* | (2006.01) |
| *B01J 21/16* | (2006.01) |
| *B01J 35/02* | (2006.01) |
| *B01J 37/02* | (2006.01) |
| *B01J 37/03* | (2006.01) |
| *B01J 37/08* | (2006.01) |
| *B01D 53/94* | (2006.01) |
| *F01N 3/20* | (2006.01) |
| *F01N 3/28* | (2006.01) |

(52) U.S. Cl.
CPC .......... *B01J 23/22* (2013.01); *B01D 53/9418* (2013.01); *B01J 21/16* (2013.01); *B01J 35/023* (2013.01); *B01J 37/0219* (2013.01); *B01J 37/0244* (2013.01); *B01J 37/038* (2013.01); *B01J 37/088* (2013.01); *F01N 3/2066* (2013.01); *F01N 3/2835* (2013.01); *B01D 2255/20707* (2013.01); *B01D 2255/20723* (2013.01); *B01D 2255/20769* (2013.01); *B01D 2255/20776* (2013.01); *B01D 2255/65* (2013.01); *B01D 2255/9202* (2013.01); *F01N 2330/10* (2013.01); *F01N 2370/02* (2013.01); *F01N 2510/06* (2013.01)

(58) Field of Classification Search
CPC . B01J 23/22; B01J 21/16; B01J 35/023; B01J 37/0219; B01J 37/0244; B01J 37/038; B01J 3/088; B01D 53/9418; B01D 2255/20707; B01D 2255/20723; B01D 2255/20769; B01D 2255/20776; B01D 2255/65; B01D 2255/9202; F01N 3/2066; F01N 3/2835; F01N 2330/10; F01N 2370/02; F01N 2510/06
See application file for complete search history.

(56) References Cited

U.S. PATENT DOCUMENTS

| | | | |
|---|---|---|---|
| 5,833,932 A | 11/1998 | Schmelz | |
| 9,108,185 B2 | 8/2015 | Augustine | |
| 11,426,709 B2 * | 8/2022 | Pedersen | ................ B01J 37/038 |
| 2001/0025009 A1 * | 9/2001 | Fischer | ..................... B01J 23/22 |
| | | | 264/642 |
| 2001/0049339 A1 * | 12/2001 | Schafer-Sindlinger | ..................... |
| | | | B01J 23/22 |
| | | | 502/350 |
| 2008/0234126 A1 * | 9/2008 | Hong | .................. B01D 53/8628 |
| | | | 502/350 |
| 2009/0263304 A1 | 10/2009 | Yoshida | |
| 2014/0105803 A1 * | 4/2014 | Hong | ....................... B01J 23/30 |
| | | | 423/239.1 |
| 2014/0155256 A1 * | 6/2014 | Becker | ................... B01J 23/888 |
| | | | 502/227 |
| 2020/0254424 A1 | 8/2020 | Nishi | |
| 2021/0180500 A1 | 6/2021 | Huennekes | |

FOREIGN PATENT DOCUMENTS

| | | | | |
|---|---|---|---|---|
| CN | 102527371 | | 7/2012 | |
| CN | 106139750 | | 11/2016 | |
| CN | 108367284 | | 8/2018 | |
| CN | 113613780 | | 11/2021 | |
| EP | 0 211 443 A1 * | | 2/1987 | ......... B01D 53/8628 |
| EP | 2 719 454 A1 * | | 4/2014 | ............. B01J 23/22 |
| JP | S57150435 | | 9/1982 | |
| JP | H02198634 | | 8/1990 | |
| JP | H06343877 | | 12/1994 | |
| JP | 2008221203 | | 9/2008 | |
| WO | 2016058713 | | 4/2016 | |
| WO | WO 2016 188 989 A1 * | | 12/2016 | ............. B01J 23/22 |
| WO | 2017072138 | | 5/2017 | |
| WO | WO 2017 216 690 A1 * | | 12/2017 | ............. B01J 37/03 |
| WO | 2018018406 | | 2/2018 | |
| WO | 2018066659 | | 4/2018 | |

OTHER PUBLICATIONS

Office Action received in CN201980055160 dated Feb. 3, 2023.
(Continued)

*Primary Examiner* — Timothy C Vanoy
(74) *Attorney, Agent, or Firm* — Suzannah K. Sundby, Esq.; Canady + Lortz LLP

(57) ABSTRACT

The present invention pertains to a catalyst for use in the selective catalytic reduction (SCR) of nitrogen oxides comprising a monolithic substrate and a coating A, which comprises an oxidic metal carrier comprising an oxide of titanium and a catalytic metal oxide which comprises an oxide of vanadium wherein the mass ratio vanadium/titanium is 0.07 to 0.26.

17 Claims, 2 Drawing Sheets

(56) References Cited

OTHER PUBLICATIONS

International Search Report received in PCT/EP2019/072706, dated Dec. 19, 2019.
Written Opinion received in PCT/EP2019/072706, dated Dec. 19, 2019.
Office Action received in JP2021510219 dated Jul. 3, 2023.

* cited by examiner

CATALYST FOR USE IN THE SELECTIVE CATALYTIC REDUCTION (SCR) OF NITROGEN OXIDES

CROSS-REFERENCE TO RELATED APPLICATIONS

This application claims the benefit of U.S. patent application Ser. No. 17/268,852, which is a national phase entry of PCT/EP2019/072706, filed Aug. 26, 2019, which is herein incorporated by reference in its entirety, which claims priority to EP 18191131.4, filed Aug. 28, 2018, and EP 19171394.0, filed Apr. 26, 2019.

FIELD OF THE INVENTION

The present invention relates to a catalyst for use in the selective catalytic reduction (SCR) of nitrogen oxides by reaction with ammonia. It in addition relates to a method for the preparation of such catalyst, which is in particular based on the use of a washcoat slurry comprising one or more catalyst metal precursor compounds dispersed on nanoparticles of an oxidic metal carrier.

BACKGROUND OF THE INVENTION

Catalysts, in particular if applied to monolithic catalyst supports, are useful in treatment of gases by heterogeneous catalysis and are widely used in automotive and stationary emission control devices and other kind of reactors in the chemical industry.

Monolithic catalyst supports are extruded substrates or are made of ceramic materials, metals or of corrugated ceramic paper stacked up or rolled up a monolithic structured substrate with a plurality of parallel gas flow channels separated by thin walls that are coated with a catalytic active substance.

Typically, the catalytic active material is supported on the substrate by applying a washcoat, typically a refractory oxide layer deposited on the catalyst substrate. The washcoat provides a porous, high surface area layer bonded to the surface of the substrate after drying, and optionally calcining in a controlled atmosphere.

The washcoat is subsequently impregnated with a solution of the catalytic active material or precursors thereof. Finally, the thus catalyzed substrate is activated by calcination at elevated temperatures.

An important field of use of monolithic catalysts is the removal of nitrogen oxides contained in off-gas.

When operating monolithic SCR catalyst in the removal of nitrogen oxides (NOx), the nitrogen oxides are converted to free nitrogen with a reducing agent usually ammonia in the presence of the catalyst supported on or within pores in the walls of the monolithic substrate by selective catalytic reduction according to reactions I and II:

$$4NO+4NH_3+O_2 \rightarrow 4N_2+6H_2O \qquad I$$

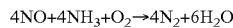

$$NO+NO_2+2NH_3 \rightarrow 2N_2+3H_2O \qquad II$$

Catalyst compounds active in the SCR reaction with ammonia are per se known in the art. To name a few, typically employed catalysts are vanadium oxide, tungsten oxide and zeolitic materials, usually exchanged with for example copper and/or iron, either used alone or as mixtures thereof. The most commonly used catalyst for the reduction of NOx from off-gas is titania-supported vanadium oxide, optionally promoted with tungsten oxide.

A problem with $V_2O_5/TiO_2$ and $V_2O_5$—$WO_3/TiO_2$ catalysts is that these catalysts are not sufficiently efficient in the ammonia SCR reaction at gas temperatures below 250° C.

A number of applications, however, require high SCR catalytic activity at gas temperatures as low as 100° C. For example stationary combustion facilities, such as steam boilers, operate typically at with off-gas temperatures between 120 to 150° C.

For other scenarios, e.g. power plants, a heat recovery steam generator (HRSG) that recovers heat from a hot with off-gas stream may be installed. The HRSG unit comprises a superheater, an evaporator and an economizer.

In the superheater and evaporator, the heat in the with off-gas is used to superheat steam and to preheat feed water before it is pumped to the boiler, which increases the boiler efficiency of the power plant. The with off-gas temperature is thereby typically cooled to approximately 150° C. The low temperature downstream of the evaporator encounters a problem in the NOx removal by means of SCR.

WO2016/058713 A1 discloses a method for preparing a catalyzed fabric filter which comprises impregnating the fabric filter substrate with an aqueous impregnation liquid comprising an aqueous hydrosol of one or more catalyst metal precursor compounds dispersed on nanoparticles of an oxidic metal carrier.

According to the disclosure of WO 2016/058713 A1 (see method of Example 1) a $NH_3VO_3/TiO_2$ ratio of 0.58 is used which corresponds to a V/Ti ratio of 0.42.

DETAILED DESCRIPTION

Figure 1:
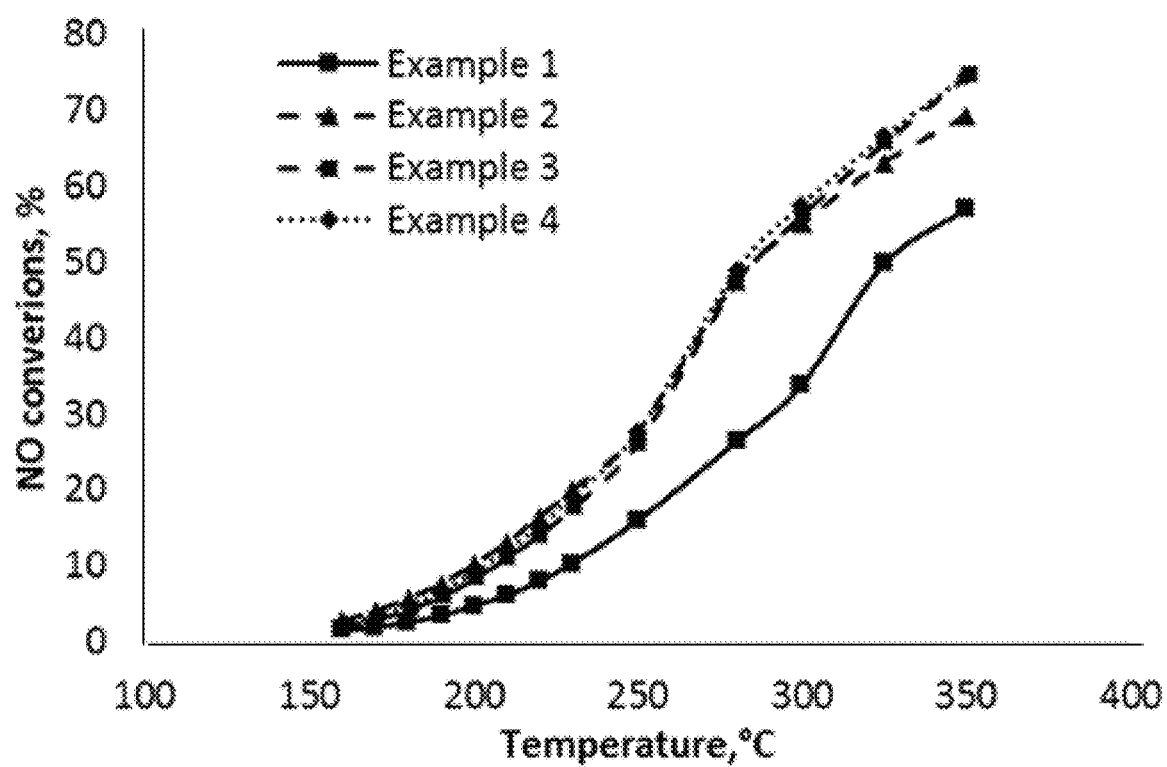
FIG. 1 is a graph showing the NO conversion activity of ammonium vanadate/titania preparations.

The inventors of the present invention now have surprisingly found that this ratio can be decreased, i.e. less vanadium can be used, without effecting the DeNOx activity of the catalyst. At the same time, $SO_2$ oxidation is reduced which subsequently will lead to less formation of ammonium bisulphate (ABS).

Accordingly, the present invention pertains to a catalyst for use in the selective catalytic reduction (SCR) of nitrogen oxides comprising
- a monolithic substrate and
- a coating A which comprises an oxidic metal carrier comprising an oxide of titanium and a catalytic metal oxide which comprises an oxide of vanadium wherein the mass ratio vanadium/titanium is 0.07 to 0.26.

Preferred embodiments of the invention are disclosed and discussed in the following. These embodiments can either be employed each alone or in combination thereof.

The monolithic substrate can be a honeycomb substrate made of ceramic material, in particular cordierite, or metal.

However, a preferred monolithic substrate contains glass fibers. These substrates have shown to have no inadequate influence on the catalytic activity of the final catalyst.

A monolithic substrate containing glass fibers preferably comprises corrugated sheets of glass fiber. It is for example produced by corrugating flat sheets of a glass fiber web and stacking a plurality of the corrugated sheets to a monolithic structure or rolling-up a single corrugated sheet to a cylindrically monolith.

Preferably, each of the corrugated sheets is provided with a flat liner made of the same material as the corrugated sheet(s), before stacking or rolling up.

The catalytic metal oxide of coating A which comprises an oxide of vanadium preferably comprises vanadium pentoxide ($V_2O_5$). Besides it optionally comprises oxides of other metals, in particular an oxide of tungsten and/or molybdenum, preferred tungsten trioxide ($WO_3$) and/or molybdenum trioxide ($MoO_3$).

The oxidic metal carrier of coating A which comprises an oxide of titanium usually comprises titanium dioxide. Besides it optionally comprises an oxide of another metal, in particular an oxide of aluminum, cerium, zirconium or mixtures, mixed oxides or compounds comprising at least one of these oxides.

Preferably, the oxidic metal carrier consists of either single or agglomerated nanoparticles of titanium dioxide with a primary particle size of between 10 and 150 nm.

According to the present invention the mass ratio vanadium/titanium is 0.07 to 0.22 and preferably 0.1 to 0.21. For the avoidance of doubt, the mass ratio is calculated based on the mass of vanadium metal and titanium metal.

Preferably, the inventive catalyst is free of platinum group metals, in particular free of palladium.

In an embodiment of the present invention the inventive catalyst comprises an additional coating B directly on the monolithic substrate and below coating A. Coating B preferably comprises an oxide of titanium, in particular titanium dioxide, and optionally of aluminum, cerium, zirconium or mixtures, mixed oxides or compounds comprising at least one of these oxides.

In another embodiment of the present invention, the oxidic metal carrier not only comprises an oxide of titanium, in particular titanium dioxide, but in addition an oxide of vanadium, in particular vanadium pentoxide and optionally oxides of tungsten and/or molybdenum, in particular tungsten trioxide and/or molybdenum trioxide.

This is in particular the case if a recycled or fresh SCR catalyst comprising vanadium pentoxide ($V_2O_5$) and titanium dioxide $TiO_2$, and optionally tungsten trioxide ($WO_3$) and/or molybdenum trioxide ($MoO_3$) is reused.

In still another embodiment, the monolithic substrate is an extrudate comprising vanadium pentoxide ($V_2O_5$) and titanium dioxide ($TiO_2$) and optionally tungsten trioxide ($WO_3$) and/or molybdenum trioxide ($MoO_3$).

Preferably, the inventive catalyst comprises from about 5 to about 95% by weight of the catalytically active material.

The present invention also pertains to a process for preparing a catalyst for use in the selective catalytic reduction (SCR) of nitrogen oxides comprising the steps of
 a) providing a monolithic substrate
 b) providing an aqueous washcoat slurry comprising one or more catalyst metal precursor compounds comprising a vanadium compound dispersed on particles of an oxidic metal carrier comprising titanium oxide;
 c) impregnating the monolithic substrate with the washcoat slurry; and
 d) drying and thermally activating the impregnated monolithic substrate at a temperature 150 to 600° C. to convert the one or more metal precursor compounds to their catalytically active form.

As regards step b) the catalyst metal precursor compound comprising a vanadium compound is preferably ammonium metavanadate. In case the inventive catalyst comprises oxides of tungsten and/or molybdenum, the washcoat slurry preferably comprises ammonium metatungstate and/or ammonium heptamolybdate.

In some applications of the process according to the invention the monolithic substrate is pre-coated prior to the impregnation of the monolithic substrate to provide a larger surface area of the substrate.

Thus, in an embodiment of the present invention, the monolithic substrate is washcoated with an oxidic metal carrier comprising oxides of titanium and optionally of aluminum, cerium, zirconium or mixtures, mixed oxides or compounds comprising at least one of these oxides, prior to impregnating the monolithic substrate with the washcoat slurry in step (c).

The thermally activation of the impregnated monolithic substrate according to step d) can be performed either before installation of the impregnated substrate or after installation of impregnated substrate in an SCR unit. Preferably, the thermal activation temperature is between 300-450° C.

In case the inventive process comprises providing a recycled catalyst in step a) which already comprises vanadium pentoxide ($V_2O_5$) and titanium dioxide $TiO_2$, and optionally tungsten trioxide ($WO_3$) and/or molybdenum trioxide ($MoO_3$), the amount of the precursor of the said oxides in the aqueous washcoat slurry can be reduced.

In the preparation of the aqueous washcoat slurry as disclosed in more detail below, the oxidic metal carrier is present in the impregnation solution in form of a hydrosol, a part of which can gelate during storage and agglomerate to a larger particle size than the preferred size.

Primary amines have shown to prevent agglomeration or to break down already formed agglomerates. It is thus preferred to add a dispersing agent to the washcoat slurry selected from one or more of primary amines.

The primary amine is preferably soluble in the aqueous washcoat slurry, when having been added in an amount resulting in the above disclosed purpose. Primary amines with fewer than seven carbon atoms are water soluble, preferred primary amines for use in the invention are therefore mono-methyl amine, mono-ethyl amine, mono-propyl amine, mono-butyl amine or mixtures thereof. Of these, the most preferred dispersing agent is mono-ethyl amine.

Good results are obtained when the primary amine dispersing agent is added to the washcoat slurry in an amount resulting in a pH value of the washcoat slurry above 7.

As known in the art, an effective catalyst requires a monolayer coverage of the catalytically active material on an oxidic metal carrier. Formation of excess crystalline catalytically active material on the carrier should be avoided.

A high dispersion of catalytically active material after thermal activation at low temperatures is possible when employing the so-called equilibrium deposition method in combination with the primary amine dispersing agent. In this method the electrostatic force of attraction between oppositely charged metal compounds is utilized to bind one metal compound on surface of the oppositely charge metal compound in finely dispersed form. $TiO_2$ and $V_xO_y^{z-}$ have opposite surface charges in the pH interval of 4 to 6. Hence, the electrostatic force of attraction facilitates deposition of $V_xO_y^{z-}$ onto $TiO_2$.

The limited solubility of $V_xO_y^{z-}$ is circumvented by the principal of Le Chatelier, when $V_xO_y^{z-}$ binds to $Ti-OH_2^+$ sites, new $V_xO_y^{z-}$ ions are solubilized. This continuous process occurs at room temperature and requires nothing but stirring and pH regulation.

Thus, the aqueous washcoat slurry is preferably prepared by the steps of
 i) adding the one or more catalyst metal precursor compounds and the oxidic metal carrier to water and continuously adding an acid to the liquid to maintain the pH of the liquid at a value where the surface charge of the one or more catalyst precursor metal compound is negative and the Zeta potential of the oxidic metal carrier is positive;
 ii) adsorbing the one or more catalyst metal precursor compound onto the surface of the oxidic metal carrier; and optionally iii) adding the dispersing agent to the thus prepared liquid in an amount to obtain a pH value above 7 of the thus prepared washcoat slurry.

Preferably, the pH value in step (i) and (ii) is maintained at between 2.5 and 5.

The catalyst of the present invention is suitable for the treatment of off-gas from automotive and stationary sources and to selectively reduce nitrogen oxides contained in said off-gas.

Accordingly, the present invention further relates to a method for treating the off-gas from automotive and stationary sources and to selectively reduce nitrogen oxides contained in said off-gas, characterized in that the off-gas is passed over an inventive catalyst.

Example 1 a) Preparation of an ammonium vanadate/titania containing washcoat slurry
1. 2250 g of demineralized water is mixed with 2630 g TiO2.
2. 381 g of ammonia meta vanadate (AMV) is added under continuous stirring. The $NH_4VO_3/TiO_2$—ratio is 0.16.
3. The pH is monitored and increases continuously.
4. The pH is adjusted with concentrated nitric acid in the interval of 4.0-4.5.
5. After a few hours the pH of the liquid remains constant and the slurry is left under constant stirring for at least 24 hours. However, the pH needs adjustment every 3 hours.
   The resulting liquid has a red color and 100 g ethylamine (70% in water) is added (or until pH~9.2-9.5).
   The liquid becomes ivory white and is subsequently milled down to a particle size of 250-400 nm (D50).
   Optionally a 5.6 g of surfactant is added to increase wash-coat uptake on the corrugated substrate
b) A monolithic substrate consisting of glass fibers is washcoated with the aqueous slurry. The V/Ti ratio of the catalyst thus obtained is 0.12.

Example 2

The method of Example 1 was repeated with the exception that the catalyst obtained has a V/Ti ratio of 0.21

Example 3

The method of Example 1 was repeated with the exception that the catalyst obtained has a V/Ti ratio of 0.24

Example 4

The method of Example 1 was repeated with the exception that the catalyst obtained has a V/Ti ratio of 0.25

Example 5 a) Preparation of an ammonium vanadate/titania containing washcoat slurry
1. 2250 g of demineralized water is mixed with 2630 g TiO2.
2. 381 g of ammonia meta vanadate (AMV) is added under continuous stirring. The $NH_4VO_3/TiO_2$—ratio is 0.16.
3. The pH is monitored and increases continuously.
4. The pH is adjusted with concentrated nitric acid in the interval of 4.0-4.5.
5. After a few hours the pH of the liquid remains constant and the slurry is left under constant stirring for at least 24 hours. However, the pH needs adjustment every 3 hours.
   The resulting liquid has a yellow color and 100 g ethylamine (70% in water) is added (or until pH~9.2-9.5).
   The liquid becomes pale yellow and is subsequently milled down to a particle size of 600-700 nm (D50).
   Optionally a 5.6 g of surfactant is added to increase wash-coat uptake on the corrugated substrate
b) A monolithic substrate consisting of glass fibers is washcoated with the aqueous slurry. The V/Ti ratio of the catalyst thus obtained is 0.12.

Tests

A part of each of the aqueous slurries obtained according to Examples 1 to 4 was dried and the powders thus obtained were tested in the ammonia SCR of NO with a gas composition containing 500 ppm NO, 533 ppm $NH_3$, 10 vol % $O_2$, 4% $H_2O$ and balance $N_2$. The results of the tests are summarized in FIG. 1.

As is apparent from FIG. 1, the powders corresponding to the catalysts of Examples 1 to 4 according to the invention possess very good NO conversion activity at higher temperatures. It is also apparent that increasing the Ti/V ratio above a value of 0.20, in particular above 0.24 does not result in a higher activity, the activity is levelled out.

On the other hand, it is the general knowledge of a person skilled in the field of selective catalytic reduction of nitrogen oxides that the (unwanted) oxidation of $SO_2$ increases with an increasing Ti/V ratio (see, for example, Applied Catalysis b: Environmental 19 (1998) 103-117).

Accordingly, the present invention allows to gain an optimal NO conversion while restricting the unwanted $SO_2$ oxidation to a minimum.

Figure 2:
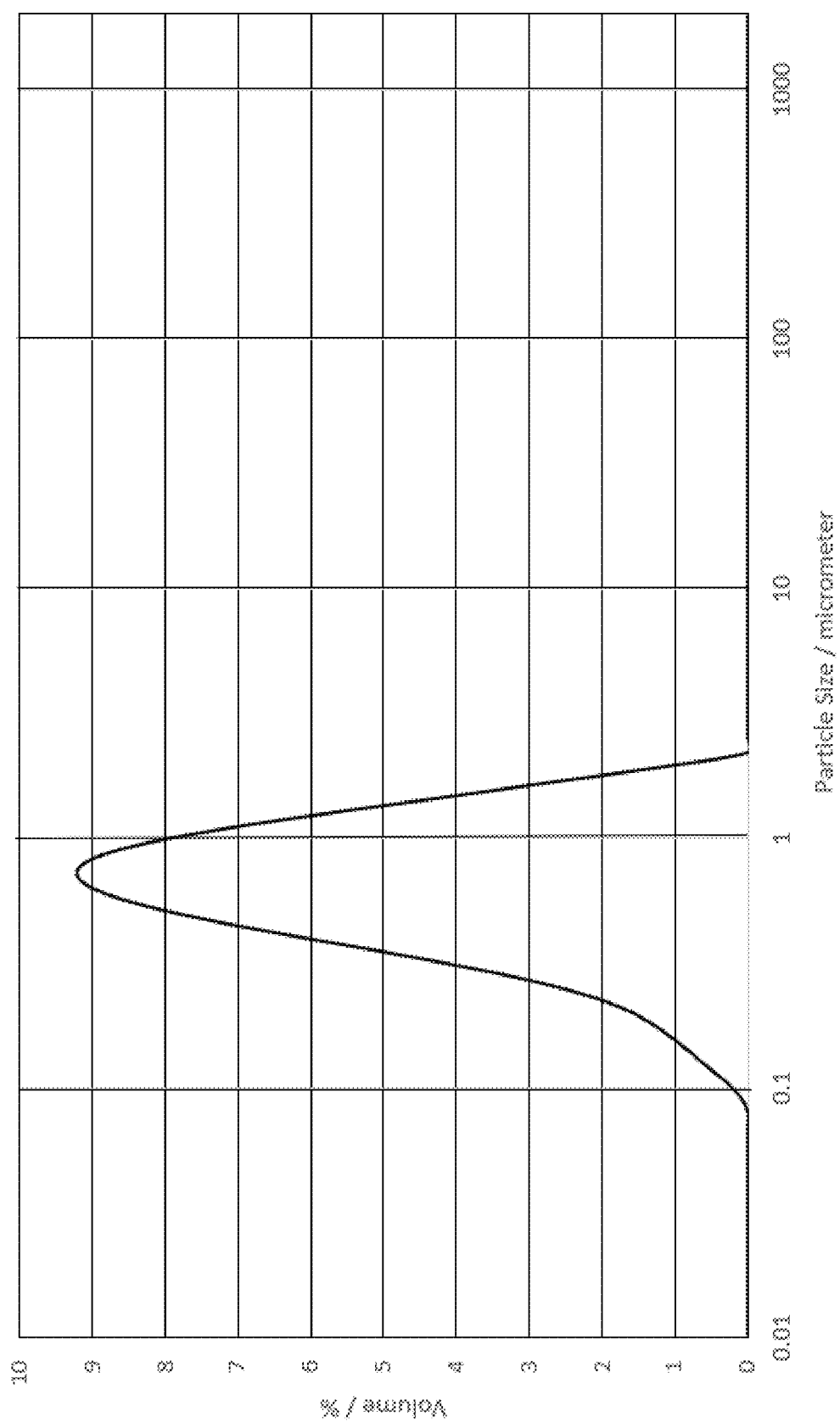
FIG. 2 is a graph showing the particle size distribution of ammonium vanadate/titania particles.

FIG. 2 shows the particle distribution of Example 5.

It has to be noted that the milling can also be performed after step a)1. as described in Examples 1 and 2. This means that the slurry of $TiO_2$ in demineralized water can be milled prior to the addition of ammonium metavanadate.

The skilled person knows how to adjust milling conditions in order to obtain a desired particle size. Suitable particle sizes of the one or more catalyst metal precursor compounds comprising a vanadium compound dispersed on particles of an oxidic metal carrier comprising titanium oxide (D50) are 200 to 750 nm, preferably 250 to 600 nm, more preferably 300 to 500 nm.

As described above, the milling can take place prior to the addition of ammonium metavanadate, i.e. after step a)1., or after the adjustment of the pH with an amine, i.e. during step a)5. as described above in Examples 1 to 5.

Exemplary Embodiments

1: A catalyst for use in the selective catalytic reduction (SCR) of nitrogen oxides comprising
  a monolithic substrate and
  a coating A which comprises an oxidic metal carrier comprising an oxide of titanium and a catalytic metal oxide which comprises an oxide of vanadium wherein the mass ratio vanadium/titanium is 0.07 to 0.26.

Embodiment 2: A catalyst according to Embodiment 1, wherein the monolithic substrate comprises corrugated sheets of glass fiber.

Embodiment 3: A catalyst according to Embodiment 1 and/or 2, wherein the catalytic metal oxide of coating A which comprises an oxide of vanadium comprises vanadium pentoxide (V2O5).

Embodiment 4: A catalyst according to Embodiment 3, wherein the catalytic metal oxide of coating A which comprises an oxide of vanadium comprises in addition an oxide of tungsten and/or molybdenum.

Embodiment 5: A catalyst according to one or more of Embodiments 1 to 4, wherein the oxidic metal carrier of coating A which comprises an oxide of titanium comprises titanium dioxide.

Embodiment 6: A catalyst according to Embodiment 5, wherein the oxidic metal carrier of coating A which comprises an oxide of titanium comprises in addition an oxide of aluminum, cerium, zirconium or mixtures, mixed oxides or compounds comprising at least one of these oxides.

Embodiment 7: A catalyst according to one or more of Embodiments 1 to 6, wherein the oxidic metal carrier consists of either single or agglomerated nanoparticles of titanium dioxide with a primary particle size of between 10 and 150 nm.

Embodiment 8: A catalyst according to one or more of Embodiments 1 to 7, wherein the mass ratio vanadium/titanium is 0.1 to 0.21.

Embodiment 9: A catalyst according to one or more of Embodiments 1 to 8, which is free of platinum group metals.

Embodiment 10: A catalyst according to one or more of Embodiments 1 to 9, which comprises an additional coating B directly on the monolithic substrate and below coating A.

Embodiment 11: A catalyst according to Embodiment 10, wherein coating B comprises an oxide of titanium and optionally of aluminum, cerium, zirconium or mixtures, mixed oxides or compounds comprising at least one of these oxides.

Embodiment 12: A process for preparing a catalyst according to one or more of Embodiments 1 to 11 comprising the steps of
   a) providing a monolithic substrate
   b) providing an aqueous washcoat slurry comprising one or more catalyst metal precursor compounds comprising a vanadium compound dispersed on particles of an oxidic metal carrier comprising titanium oxide;
   c) impregnating the monolithic substrate with the washcoat slurry; and
   d) drying and thermally activating the impregnated monolithic substrate at a temperature 150 to 600° C. to convert the one or more metal precursor compounds to their catalytically active form.

Embodiment 13: A process according to Embodiment 12, wherein the catalyst metal precursor compound comprising a vanadium compound is ammonium metavanadate.

Embodiment 14: A process according to Embodiment 12 and 13, wherein the aqueous washcoat slurry comprises a primary amine soluble in that liquid.

Embodiment 15: A process according to Embodiment 14, wherein the primary amine is mono-ethyl amine.

Embodiment 16: A process according to any one of Embodiments 12 to 15, wherein the one or more catalyst metal precursor compounds comprising a vanadium compound dispersed on particles of an oxidic metal carrier comprising titanium oxide have a particle size D50 of 200 to 750 nm.

Embodiment 17: A method for treating the off-gas from automotive and stationary sources and selectively reduce nitrogen oxides contained in said off-gas, wherein the off-gas is passed over a catalyst according to one or more of Embodiments 1 to 11.

The invention claimed is:

1. A catalyst for use in the selective catalytic reduction (SCR) of nitrogen oxides comprising
   a monolithic substrate and
   a coating A which comprises an oxidic metal carrier comprising an oxide of titanium and a catalytic metal oxide which comprises an oxide of vanadium wherein the mass ratio vanadium/titanium is 0.07 to 0.22.

2. The catalyst according to claim 1, wherein the mass ratio vanadium/titanium is 0.1 to 0.21.

3. The catalyst according to claim 1, wherein the monolithic substrate comprises
   a) comprises corrugated sheets of glass fiber,
   b) comprises corrugated ceramic paper stacked up or rolled up,
   c) comprises a corrugated sheets with a flat liner, or
   d) is an extrudate comprising vanadium pentoxide and titanium dioxide.

4. The catalyst according to claim 1, wherein the catalytic metal oxide of coating A which comprises an oxide of vanadium comprises vanadium pentoxide ($V_2O_5$).

5. The catalyst according to claim 4, wherein the catalytic metal oxide of coating A which comprises an oxide of vanadium comprises in addition an oxide of tungsten and/or molybdenum.

6. The catalyst according to claim 1, wherein the oxidic metal carrier of coating A which comprises an oxide of titanium comprises titanium dioxide.

7. The catalyst according to claim 6, wherein the oxidic metal carrier of coating A which comprises an oxide of titanium comprises in addition an oxide of aluminum, cerium, zirconium or mixtures, mixed oxides or compounds comprising at least one of these oxides.

8. The catalyst according to claim 1, wherein the oxidic metal carrier consists of either single or agglomerated nanoparticles of titanium dioxide with a primary particle size of between 10 and 150 nm.

9. The catalyst according to claim 1, which is free of platinum group metals.

10. The catalyst according to claim 1, which comprises an additional coating B directly on the monolithic substrate and below coating A.

11. The catalyst according to claim 10, wherein coating B comprises an oxide of titanium and optionally of aluminum, cerium, zirconium or mixtures, mixed oxides or compounds comprising at least one of these oxides.

12. A process for preparing a catalyst according to claim 1, comprising the steps of
   a) providing a monolithic substrate
   b) providing an aqueous washcoat slurry comprising one or more catalyst metal precursor compounds comprising a vanadium compound dispersed on particles of an oxidic metal carrier comprising titanium oxide;
   c) impregnating the monolithic substrate with the washcoat slurry; and
   d) drying and thermally activating the impregnated monolithic substrate at a temperature 150 to 600° C. to convert the one or more metal precursor compounds to their catalytically active form.

13. The process for preparing a catalyst according to claim 12, wherein the catalyst metal precursor compound comprising a vanadium compound is ammonium metavanadate.

14. The process for preparing a catalyst according to claim 12, wherein the aqueous washcoat slurry comprises a primary amine soluble in that liquid.

15. The process for preparing a catalyst according to claim 14, wherein the primary amine is mono-ethyl amine.

16. The process for preparing a catalyst according to claim 12, wherein the one or more catalyst metal precursor compounds comprising a vanadium compound dispersed on particles of an oxidic metal carrier comprising titanium oxide have a particle size D50 of 200 to 750 nm.

17. A method for treating the off-gas from automotive and stationary sources and selectively reduce nitrogen oxides contained in said off-gas, wherein the off-gas is passed over a catalyst according to claim 1.

\* \* \* \* \*